United States Patent
Bronnikov

(10) Patent No.: US 7,930,707 B2
(45) Date of Patent: Apr. 19, 2011

(54) OPTIMIZING CODE MOTION WITH DELAYED EXCEPTION HANDLING

(75) Inventor: Dmitri Bronnikov, Foster City, CA (US)

(73) Assignee: Oracle International Corp., Redwood Shores, CA (US)

( * ) Notice: Subject to any disclaimer, the term of this patent is extended or adjusted under 35 U.S.C. 154(b) by 993 days.

(21) Appl. No.: 11/431,208

(22) Filed: May 10, 2006

(65) Prior Publication Data
US 2007/0266375 A1 Nov. 15, 2007

(51) Int. Cl.
*G06F 3/00* (2006.01)
*G06F 9/45* (2006.01)

(52) U.S. Cl. ........ 719/331; 717/151

(58) Field of Classification Search ......... 719/331; 717/151
See application file for complete search history.

(56) References Cited

U.S. PATENT DOCUMENTS

| | | | | |
|---|---|---|---|---|
| 5,278,985 A | * | 1/1994 | Odnert et al. | 712/244 |
| 5,778,211 A | * | 7/1998 | Hohensee et al. | 703/26 |
| 6,871,173 B1 | * | 3/2005 | Brauch | 703/26 |
| 7,051,340 B2 | * | 5/2006 | Fisher et al. | 719/328 |
| 7,516,453 B1 | * | 4/2009 | Bugnion | 718/1 |
| 2002/0092002 A1 | * | 7/2002 | Babaian et al. | 717/137 |
| 2003/0101431 A1 | * | 5/2003 | Duesterwald et al. | 717/111 |
| 2007/0214342 A1 | * | 9/2007 | Newburn et al. | 712/216 |

OTHER PUBLICATIONS

"Partial Redundancy Elimination" by Max Hailperin, Jan. 23, 2005.*

* cited by examiner

*Primary Examiner* — Andy Ho
*Assistant Examiner* — Carina Yun
(74) *Attorney, Agent, or Firm* — Kraguljac & Kalnay, LLC

(57) ABSTRACT

Systems, methods, media, and other embodiments associated with optimizing code motion with delayed exception handling are described. One exemplary system embodiment includes a data store to store information about a relocated instruction, a relocation logic to relocate instructions, and a run-time logic to detect exceptions raised by executed instructions. The run-time logic may selectively delay handling exceptions based on whether an executed instruction is a relocated instruction.

17 Claims, 7 Drawing Sheets

US 7,930,707 B2

OPTIMIZING CODE MOTION WITH DELAYED EXCEPTION HANDLING

BACKGROUND

An optimizing compiler may move (e.g., relocate) code (e.g., instruction, code fragment) in an executable to try to improve the performance of the executable. The compiler may record from where the code was moved and to where the code was moved. This may be done, for example, at the instruction level, at the block level, and so on.

Moving an instruction may change program semantics if the moved instruction raises an exception when executed in the new location. The semantics may change because the exception may be raised earlier than it would have been raised if the instruction was not moved. The semantics also may change if, for example, a computation is moved ahead of another statement to which the results of earlier statements and/or exceptions matter, even after an exception is raised. For example, consider a statement that updates a database with results from an earlier statement. In this case, the semantics of a program may be altered by an exception in the moved instruction unless the exception is delayed. Thus, to both preserve order and to preserve certain results, an exception raised by a moved instruction may be delayed.

FIG. 1 facilitates understanding this "out-of-order" exception raising and its effect on semantics. An executable may include, for example, code fragments 110, 120, 130, and 140. If code fragment 130 is moved ahead of code fragment 120, and if both code fragments would raise an exception, then the semantics of the executable would change. Absent the relocation, the exception from code fragment 120 would have been raised and handled before that of code fragment 130. However, after relocation, the exception from code fragment 130 would be raised and handled out of order. Since the order of the exceptions is altered, the executable may produce a different result. While FIG. 1 illustrates an out-of-order issue, it is to be appreciated that moving code may produce other issues, for example the result preservation issue described above.

To avoid this, optimizing compilers have been limited in that they may not have moved code around other code that may raise an exception. In some environments (e.g., PL/SQL (procedural language, structured query language)), where some if not all instructions may raise an exception, this may inhibit code motion entirely, which is a severe limitation.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Figure 1:
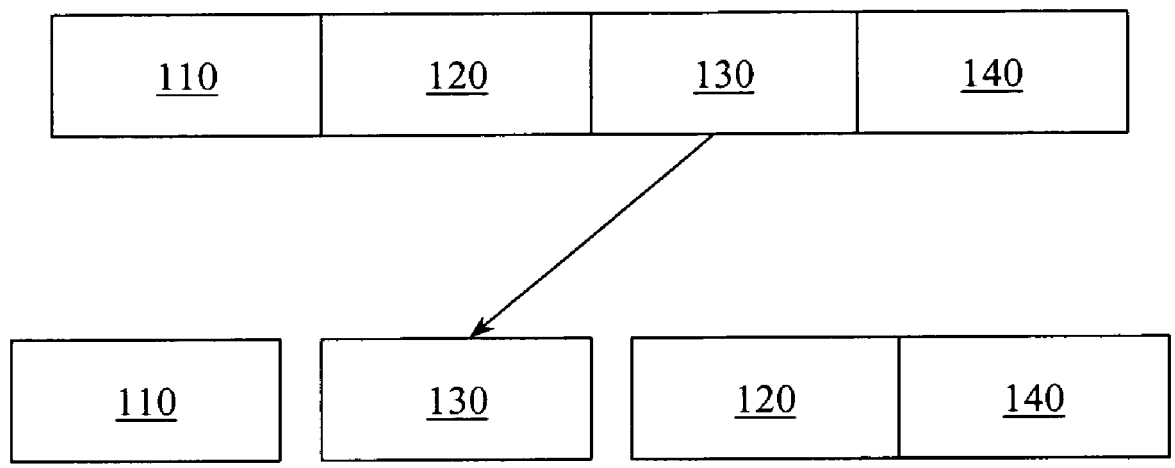
FIG. 1 illustrates code fragments being re-arranged.

Systems, methods, and media associated with selectively delaying exceptions caused by relocated instructions are described. For instructions that are relocated to a point where they may be executed earlier than if located in their original position, an exception may either be held in abeyance (e.g., temporarily suspended, delayed) until a later point in time or selectively abandoned. If the precise location from which the instruction was relocated is known, then the exception may be held until that precise location is reached. If only a region (e.g., block) from which the instruction was relocated is known, then the exception may be held until that region is reached.

While the delayed exception is being held, another instruction may also raise an exception. If this instruction is also a relocated instruction, then this exception may also be held. However, if this instruction is in its original location, then the exception may be handled and delayed exceptions that are being held may be dismissed (e.g., abandoned, deleted) since they may not have been raised if the relocated instruction had appeared in its original location.

An optimizing compiler or other code relocating logic may therefore create and/or maintain data (e.g., a table) that relates locations from which instructions are moved and locations to which instructions are moved. A run time system may then consult this data when an instruction raises an exception. For relocated instructions, exceptions may be delayed. For instructions in their original locations, exceptions may be handled and delayed exceptions may be released.

A run time system may also determine whether an executable reaches a point from which an instruction was moved. If the run time system determines that an executable has reached a point from which an instruction was moved and that an exception has been delayed, then the run time system may raise and handle the exception and may also dismiss other delayed exceptions.

Some compilers and/or run time systems may operate in a partial redundancy elimination (PRE) environment. PRE is a compile-time optimization. PRE may remove the same instruction from multiple locations and insert the same instruction at multiple other locations. For example, PRE may remove I1 (instruction 1) from B1 (block 1), B12, and B20 and may insert I1 into B3 and B10. In one embodiment, blocks B1, B12, and B20 may be added to data describing blocks from which an instruction was relocated so that once one of them is hit, a delayed exception that occurred in B3 or B10 is handled. This is made possible since the theorem of PRE efficiency guarantees that a program will hit one of B1, B12 or B20 after block B3 or B10. Otherwise inserting the instruction to B3 or B10 would be potentially redundant. Thus, example delayed exception systems and methods facilitate more optimizing code motion at compile-time, even in a PRE environment.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Machine-readable medium", as used herein, refers to a storage medium that stores instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), and so on.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software stored on a machine-readable storage medium and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, cooperating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a machine-readable medium. Software may include signals that transmit program code to a recipient over a network or other communication medium.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Figure 2:
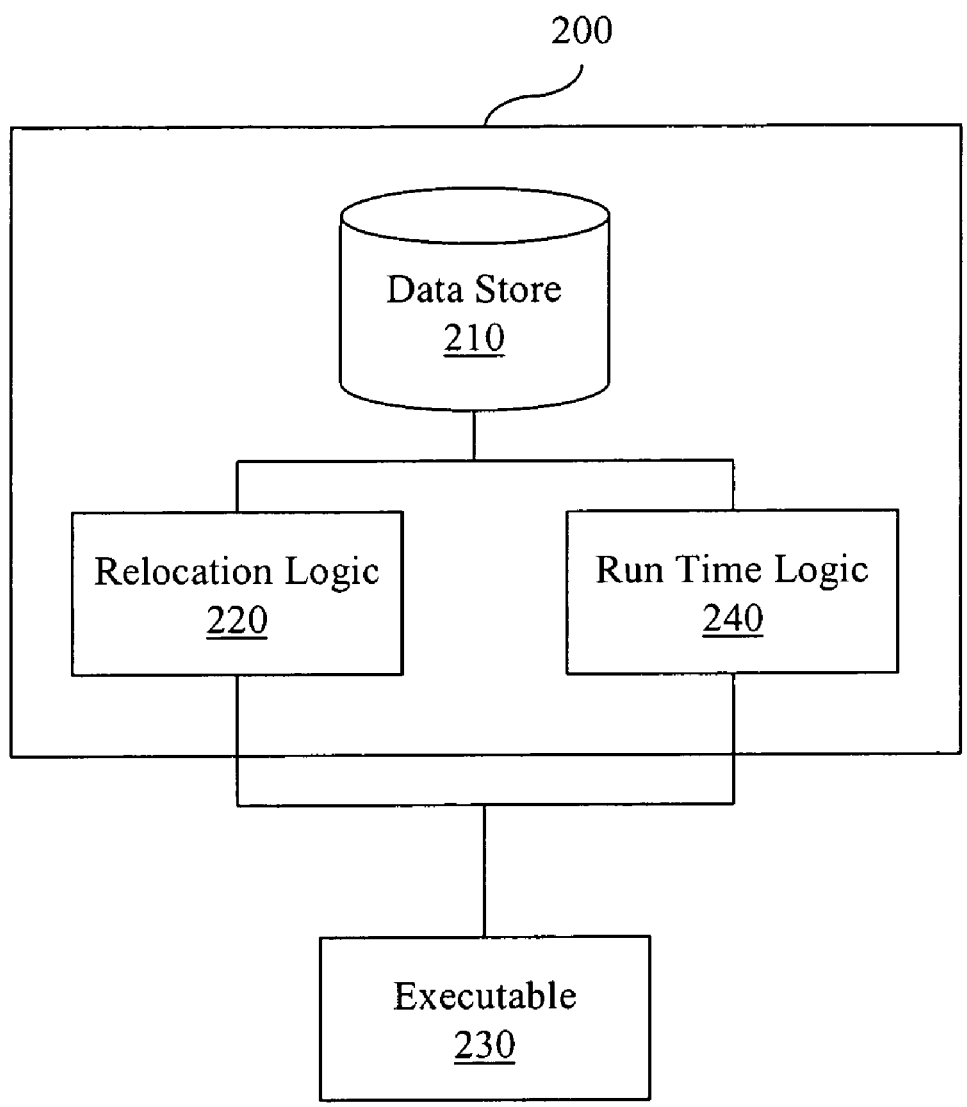
FIG. 2 illustrates an example delayed exception handling system.

FIG. 2 illustrates a delayed exception handling system 200. System 200 may include, for example, a data store 210. Data store 210 may store data including a code section source address, a code section destination address, a delayed exception data, and so on. In one example, the code section source and destination addresses may be instruction addresses. In another example, the code section source and destination addresses may be block addresses. The source and destination addresses may be block addresses, for example, in a PRE environment. The code section may be, for example, a set of executable instructions.

System 200 may also include a relocation logic 220. Relocation logic 220 may relocate a code section from a source location in an executable 230 to a destination location in the executable 230. For example, to optimize program performance, a calculation or other instruction may be moved from an original location to a new location. To facilitate reacting to exceptions raised by relocated instructions, relocation logic 220 may store in the data store 210 information associated with the source location and with the destination location. To facilitate determining that a location from where an instruction was relocated has been reached, relocation logic 220 may also associate an execution breakpoint with the source location. The execution breakpoint may be inserted, for example, by a debugger logic like those known to those skilled in the art.

System 200 may also include a run-time logic 240. Run-time logic 240 may detect an exception raised by an executed instruction in the executable 230. After detecting an exception, run-time logic 240 may identify whether the executed instruction is a relocated instruction. In one example, identifying whether the executed instruction is a relocated instruction includes comparing the address of the next instruction to be executed to a code section destination address stored in the data store 210. If the addresses match, then the next instruction to be executed is a relocated instruction whose source and destination address were stored in the data store 210.

Run-time logic 240 may also selectively delay handling the exception if the executed instruction is a relocated instruction. In one example, selectively delaying handling the exception includes storing data in the data store 210. The stored data may include, for example, delayed exception data associated with the exception. This delayed exception data may include, for example, an exception type, an exception time, an instruction that caused the exception, source and/or destination addresses associated with the exception, and so on.

Delayed exceptions may go abandoned when other exceptions are raised. In one example, one delayed exception will be raised while all the other delayed exceptions go abandoned. Thus, run-time logic 240 may selectively abandon a delayed exception associated with an instruction previously executed in the executable. In one example, selectively abandoning a delayed exception includes deleting data from the data store 210. The deleted data may include, for example, delayed exception data associated with the delayed exception. This delayed exception data may include, for example, an exception type, an exception time, an instruction that caused the exception, source and/or destination addresses associated with the exception, and so on.

Figure 3:
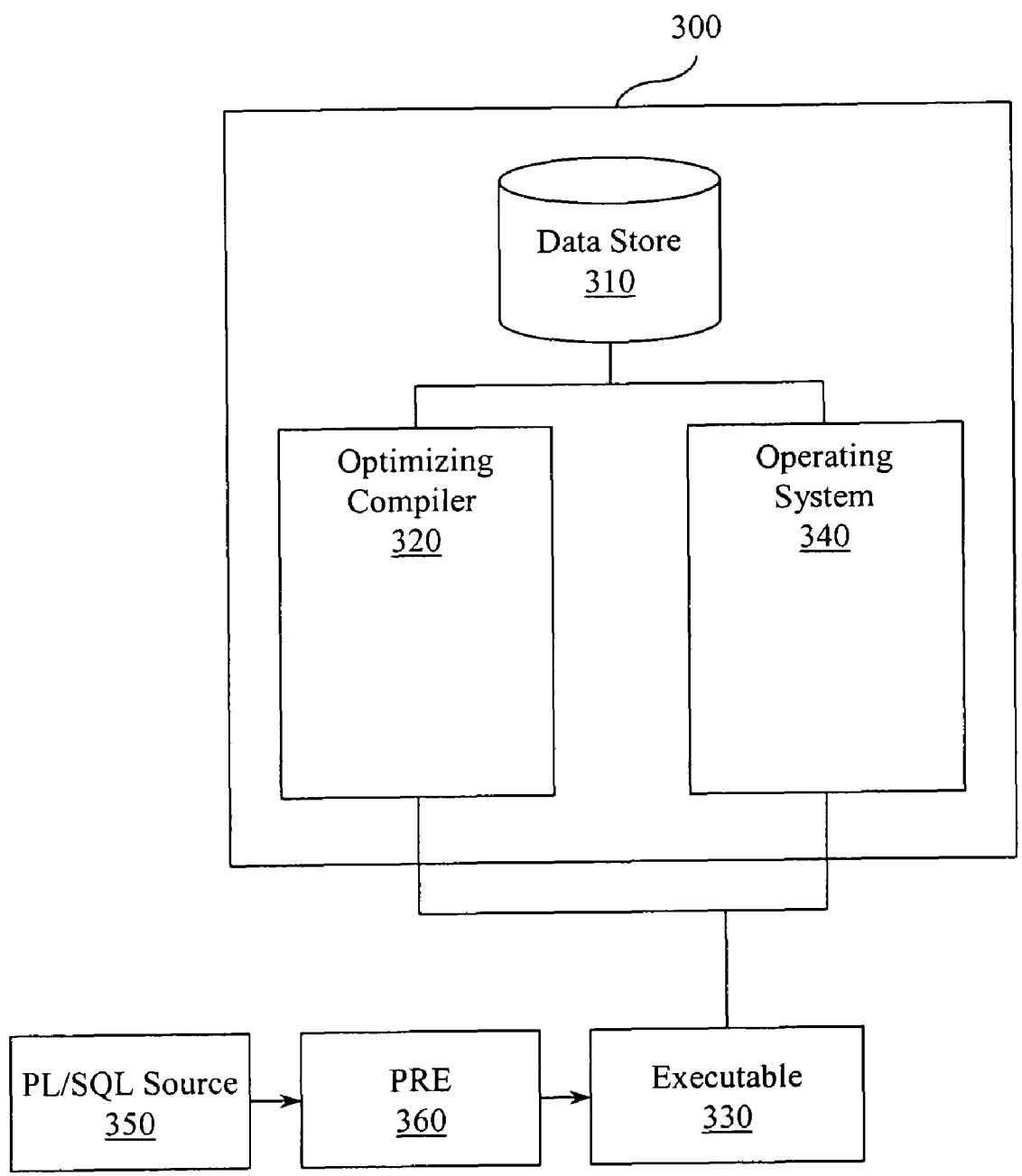
FIG. 3 illustrates an example delayed exception handling system.

FIG. 3 illustrates a delayed exception handling system 300. System 300 has some element similar to those described in connection with system 200 (FIG. 2). For example, system 300 includes a data store 310 and elements that interact with an executable 330. In system 300, the relocation logic 220 of system 200 may be an optimizing compiler 320. Thus, the optimizing compiler 320 may determine which instructions to relocate in executable 330 and the locations from which and to which they are to be relocated.

In system 300, the run-time logic 240 of system 200 may be an operating system 340. The operating system 340 may include elements including a run-time system, an exception detecting system, an exception handling system, and so on. These systems may interact with data store 310 to facilitate delaying handling of exceptions raised by relocated instructions in executable 330. For example, these systems may place data in data store 310, read and react to data stored in data store 310, and/or may remove data from data store 310. This data may include, for example, source addresses, destination addresses, delayed exception information, and so on.

In one example, executable 330 may include executable instructions produced from a PL/SQL (procedural language, structured query language) source 350. Source 350 may include a set of PL/SQL statements that are compiled in a PRE (partial redundancy elimination) environment 360.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Figure 4:
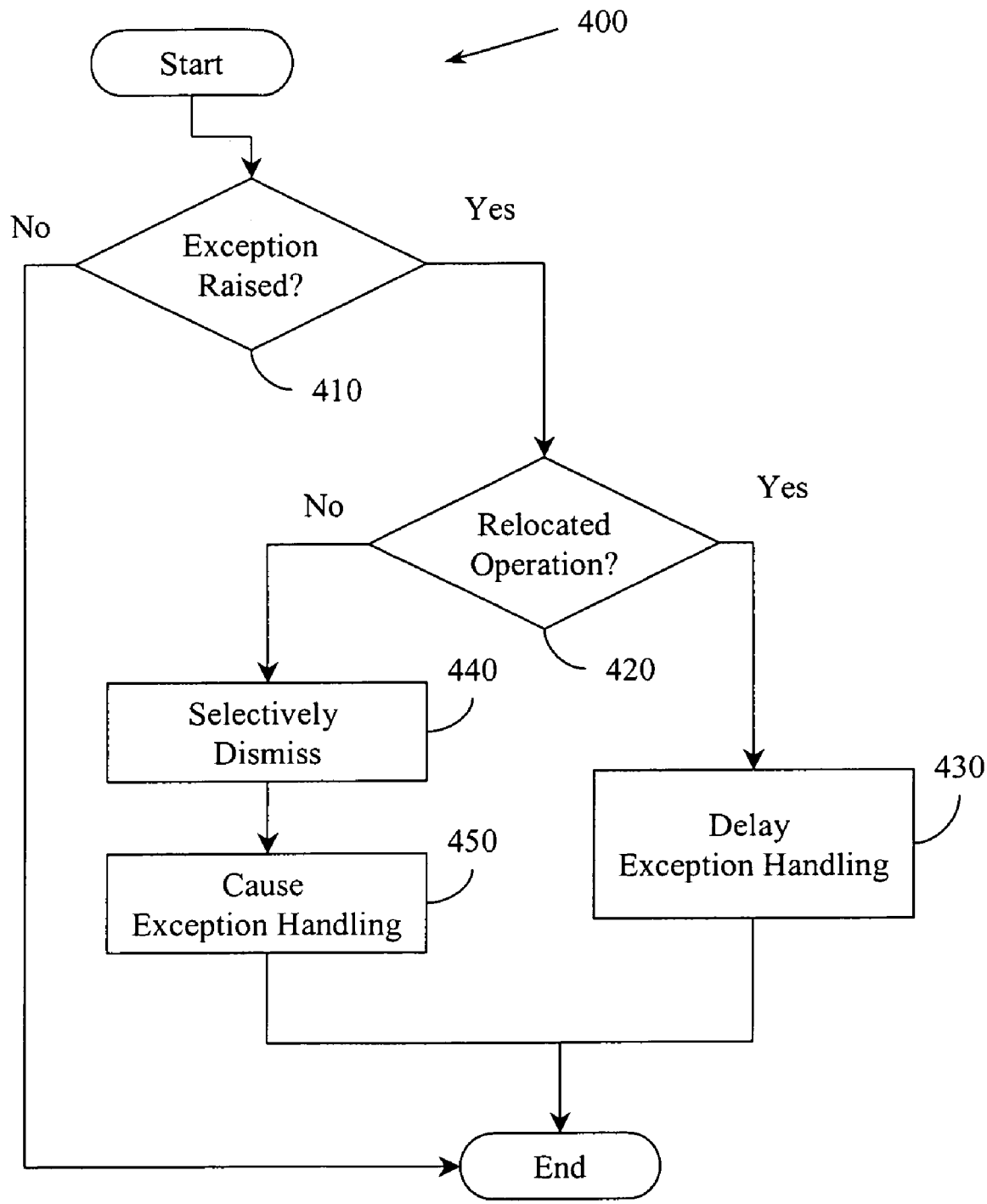
FIG. 4 illustrates an example delayed exception handling method.

FIG. 4 illustrates a method 400 for delayed exception handling. Method 400 may include, at 410, determining whether an operation raised an exception. This determination may be made, for example, by receiving a signal, by examining a data value, and so on.

Method 400 may also include, at 420, determining whether the operation that raised the exception is a relocated operation. This determination may be made, for example, by comparing a program counter to a relocated operation destination address. The relocated operation destination address may be available, for example, in a data store that was manipulated by a logic that relocated the operation.

If the operation raised an exception, and the operation was a relocated operation, then method 400 may, at 430, cause exception handling to be delayed. In one example, causing exception handling to be delayed includes storing data concerning the exception and the operation. The data may include, for example, an exception type, an exception time, a program counter value, an operation identifier, an operation source address, an operation destination address, and so on. This information may be stored, for example, with the data that facilitated identifying whether the operation was a relocated operation.

If the operation raised an exception, but the operation was not a relocated operation, then method 400 will proceed, at 440, to selectively dismiss pending delayed exceptions and, at 450, to cause the raised exception to be handled. Dismissing a pending delayed exception may include, for example, manipulating and/or deleting data associated with the pending delayed exception(s). For example, data including pending delayed exception types, times, relationships to relocated operations, and so on may be manipulated and/or deleted. Causing exception handling to occur may include, for example, generating a signal to an exception handling logic, providing exception information to an exception handling logic, and so on.

Figure 5:
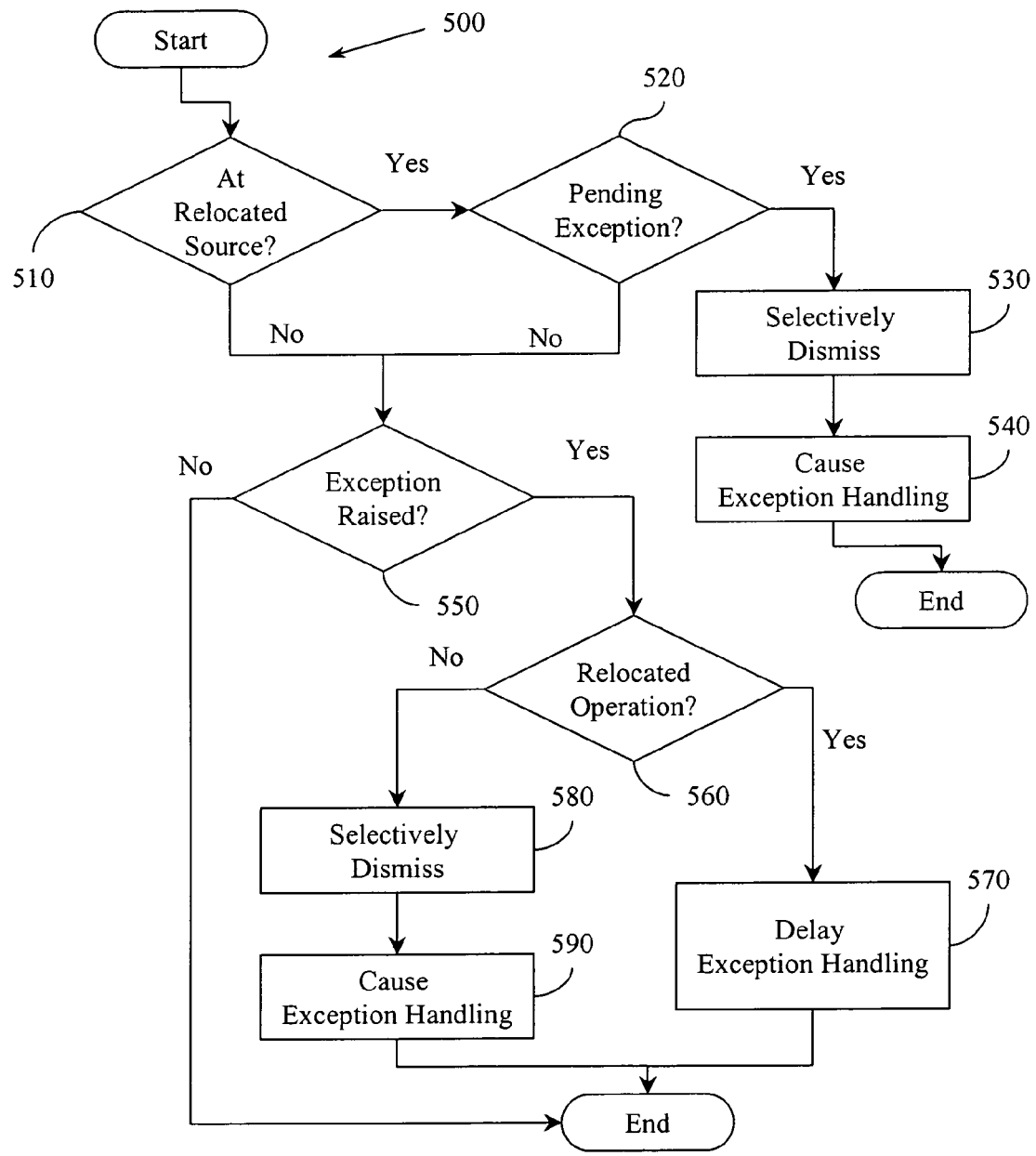
FIG. 5 illustrates an example delayed exception handling method.

FIG. 5 illustrates a method 500 for delayed exception handling. Method 500 includes some actions similar to those described in connection with method 400 (FIG. 4). For example, the determinations at 550 and at 560, as well as the actions at 570, 580, and 590 are similar to determinations and actions described in method 400. However, method 500 includes additional determinations and actions.

For example, method 500 may include, at 510, identifying whether an executing program has reached a relocated operation source. Identifying whether an executable has arrived at a relocated operation source may include, for example, detecting a break in execution caused by a break point, comparing a program counter to stored relocation operation source addresses, and so on. Additionally, method 500 may include, at 520, identifying whether there is a pending delayed exception associated with the relocated operation source. Identifying whether there is a pending delayed exception may include, for example, searching delayed exception data, and so on. If the executable has arrived at a relocation source and there is an exception pending for that relocation source, then method 500 will proceed, at 530, to selectively dismiss a pending delayed exception(s) not associated with the relocated operation source. Dismissing a pending delayed exception may include, for example, deleting stored exception data. Based on the same determinations, method 500 will also proceed, at 540, to cause a pending delayed exception associated with the relocated operation source to be handled. This may include, for example, providing a signal to an exception handling logic, providing exception information to an exception handling logic, and so on.

In one embodiment of the invention, actions associated with relocating operations may be performed. For example, a portion (e.g., instruction, set of instructions) of an executable program may be relocated from a first location in the executable program to a second location in the executable program. Since actions will be taken based on relocation sources and destinations, data concerning an association between the relocated operation source and the relocated operation destination may be stored. Additionally, to facilitate determining that an executable has reached a relocation source, a break point may be associated with the relocated operation source and information about that break point may be stored.

While FIG. 5 illustrates various actions occurring in serial, it is to be appreciated that various actions illustrated in FIG. 5 could occur substantially in parallel. By way of illustration, a first process could determine whether an executing instruction is associated with a relocated source and thus whether an executable has reached a location associated with a relocated source. A second process could determine whether an exception was raised by an executed instruction, and a third process could determine whether the executed instruction was a relocated instruction. Additionally, fourth and/or fifth processes could be tasked with causing an exception to be handled or delayed. While five processes are described, it is to be appreciated that a greater and/or lesser number of processes could be employed and that lightweight processes, regular processes, threads, and other approaches could be employed.

In one example, a method may be implemented as processor executable instructions. Thus, in one example, a machine-readable medium may store processor executable instructions that if executed by a machine (e.g., processor) cause the machine to perform a method that includes selectively causing handling of the exception to be delayed upon determining that an operation has raised an exception and that the operation is a relocated operation. The method may also include selectively dismissing pending delayed exceptions and causing the raised exception to be handled upon determining that an operation has raised an exception and that the operation is not a relocated operation. The method may also include selectively dismissing pending delayed exceptions not associated with the relocated operation source and causing a pending delayed exception associated with the relocated operation source to be handled upon determining that an executing program has reached a relocated operation source and that there is a pending delayed exception associated with the relocated operation source. While the above method is described being stored on a machine-readable medium, it is to be appreciated that other example methods described herein may also be stored on a machine-readable medium.

Figure 6:
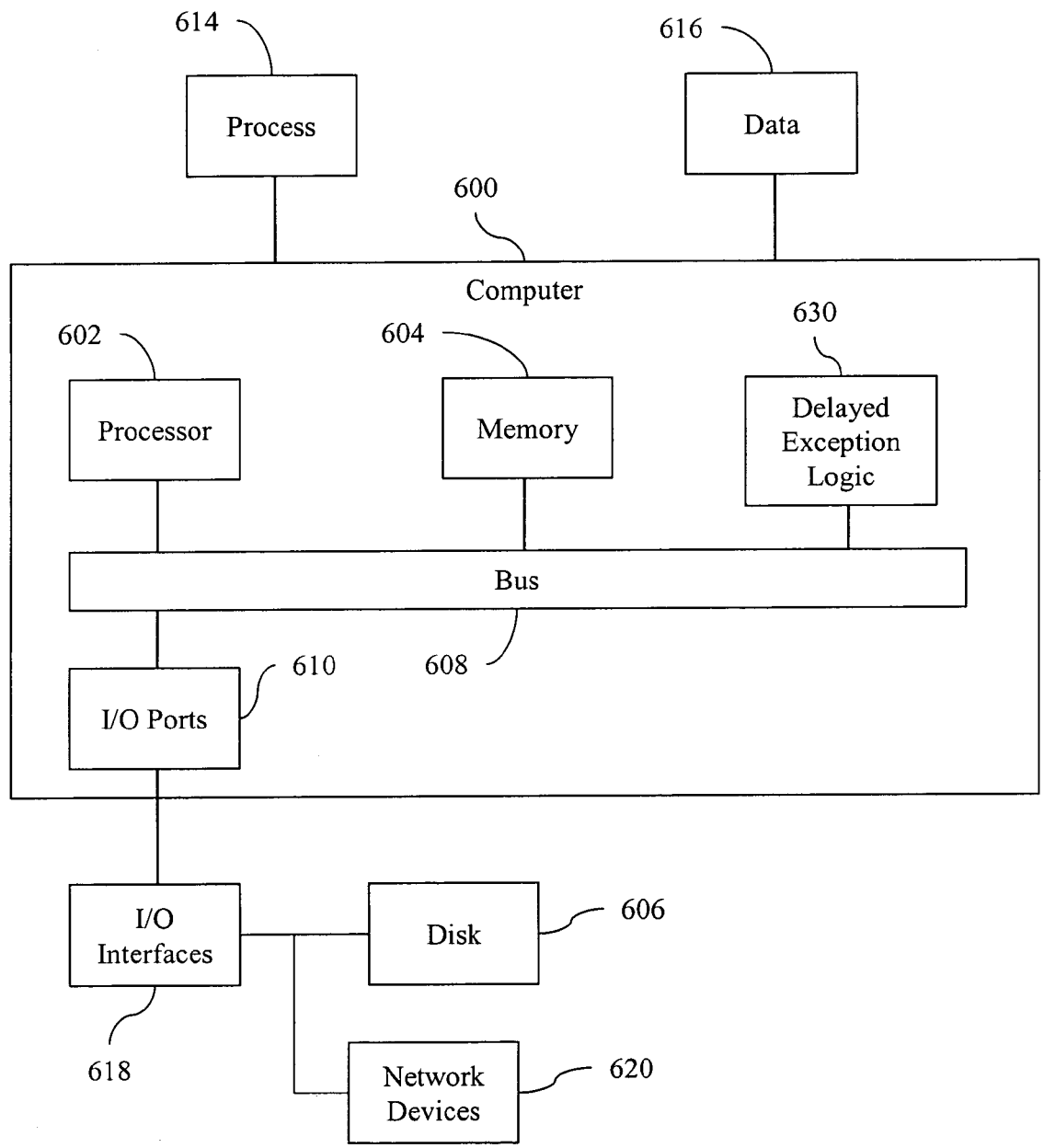
FIG. 6 illustrates an example computing environment in which example systems and methods illustrated herein may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, computer 600 may include a delayed exception logic 630 that facilitates optimizing code motion. In different examples, logic 630 may be implemented in hardware, software, firmware, and/or combinations thereof. Thus, logic 630 may provide means (e.g., hardware, software, firmware) for relocating a computer-executable instruction in a computer-executable program, means (e.g., hardware, software, firmware) for storing information about the relocation, and means (e.g., hardware, software, firmware) for selectively delaying processing an exception produced by a relocated computer-executable instruction. While logic 630 is illustrated as a hardware component attached to bus 608, it is to be appreciated that in one example, logic 630 could be implemented in processor 602.

Generally describing an example configuration of computer 600, processor 602 may be a variety of various processors including dual microprocessor and other multi-processor architectures. Memory 604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 606 may be operably connected to the computer 600 via, for example, an input/output interface (e.g., card, device) 618 and an input/output port 610. Disk 606 may be, for example, a magnetic disk drive, a solid state disk drive, a floppy disk drive, a tape drive, a Zip drive, a flash memory card, and/or a memory stick. Furthermore, disk 606 may be a CD-ROM, a CD recordable drive (CD-R drive), a CD rewriteable drive (CD-RW drive), and/or a digital video ROM drive (DVD ROM). Memory 604 can store processes 614 and/or data 616, for example. Disk 606 and/or memory 604 can store an operating system that controls and allocates resources of computer 600.

Bus 608 may be a single internal bus interconnect architecture and/or other bus or mesh architectures. While a single bus is illustrated, it is to be appreciated that computer 600 may communicate with various devices, logics, and peripherals using other busses (e.g., PCIE, SATA, Infiniband, 1394, USB, Ethernet). Bus 608 can be types including, for example, a memory bus, a memory controller, a peripheral bus, an external bus, a crossbar switch, and/or a local bus. The local bus may be, for example, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 600 may interact with input/output devices via i/o interfaces 618 and input/output ports 610. Input/output devices may be, for example, a keyboard, a microphone, a pointing and selection device, cameras, video cards, displays, disk 606, network devices 620, and so on. Input/output ports 610 may include, for example, serial ports, parallel ports, and USB ports.

Computer 600 can operate in a network environment and thus may be connected to network devices 620 via i/o interfaces 618, and/or i/o ports 610. Through the network devices 620, computer 600 may interact with a network. Through the network, computer 600 may be logically connected to remote computers. Networks with which computer 600 may interact include, but are not limited to, a local area network (LAN), a wide area network (WAN), and other networks. In different examples, network devices 620 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, network devices 620 may connect to WAN technologies including, for example, point to point links, circuit switching networks (e.g., integrated services digital networks (ISDN)), packet switching networks, and digital subscriber lines (DSL).

Figure 7:
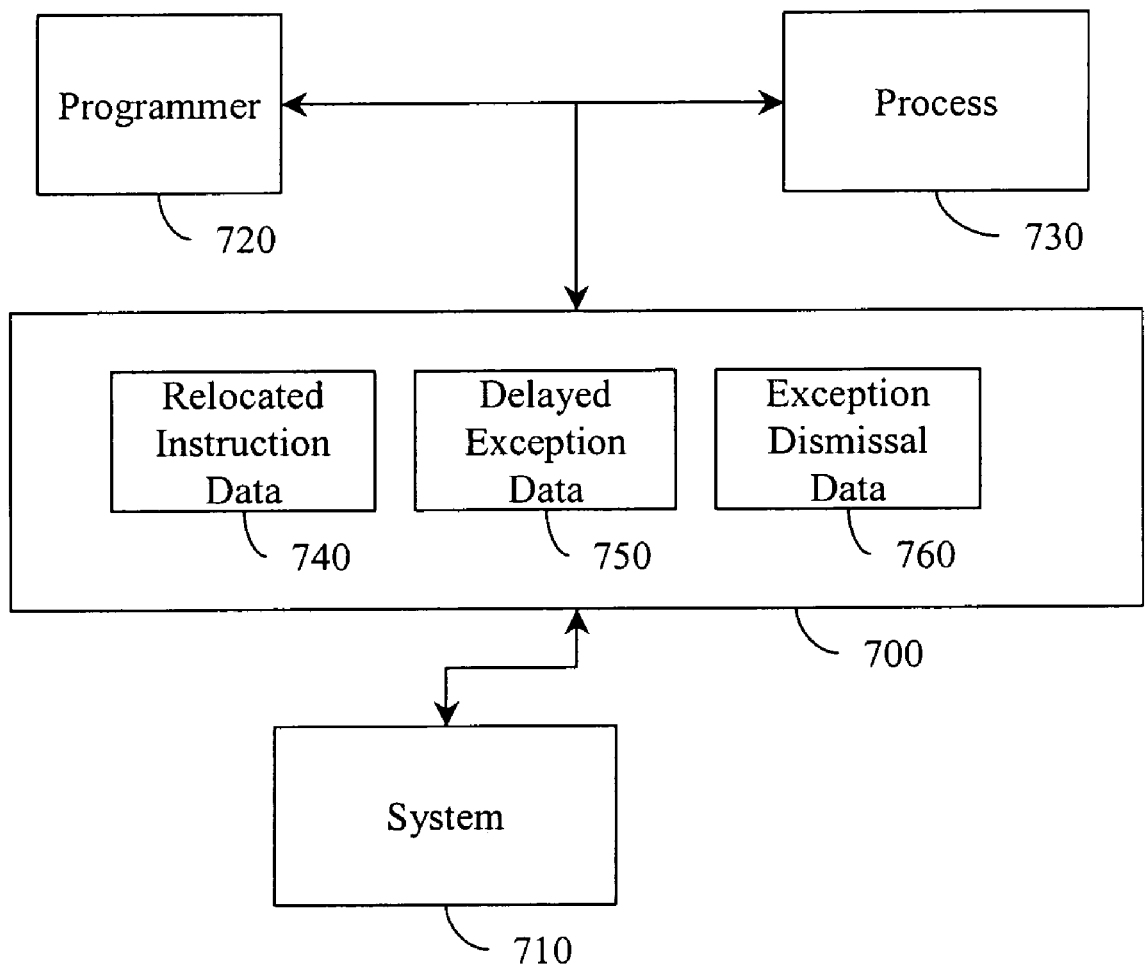
FIG. 7 illustrates an example application programming interface (API).

FIG. 7 illustrates an application programming interface (API) 700 that provides access to a system 710 for delayed handling of exceptions associated with relocated instructions. API 700 can be employed, for example, by a programmer 720 and/or a process 730 to gain access to processing performed by system 710 and/or a functionally equivalent method. For example, programmer 720 can write a program to access system 710 (e.g., invoke its operation, monitor its operation, control its operation) where writing the program is facilitated by the presence of API 700. Rather than programmer 720 having to understand the internals of system 710, programmer 720 merely has to learn the interface to system 710. This facilitates encapsulating the functionality of system 710 while exposing that functionality.

Interfaces in API 700 can include, but are not limited to, a first interface 740 that communicates a relocated instruction data. Relocated instruction data may include, for example, a source address, a destination address, a breakpoint identifier, and so on. The interfaces may also include a second interface 750 that communicates a delayed exception data. Delayed exception data may include, for example, a program counter value, a relocated instruction source address, an exception type, and so on. The interfaces may also include a third interface 760 that communicates an exception dismissal data. Exception dismissal data may include, for example, a list of pending exceptions to be dismissed, a superceding exception identifier, and so on.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a data store, embodied on a computer-readable storage medium, to store a code section source address, a code section destination address, and a delayed exception data;
    a relocation logic to relocate a code section from a source location in an executable to a destination location in the executable, to store in the data store information associated with the source location and with the destination location; and
    a run-time logic to detect an exception raised by an executed instruction in the executable during run-time, to identify whether the executed instruction is a relocated instruction from the relocated code section and, to delay handling the exception if the executed instruction is a relocated instruction from the relocated code section, and
    where the run-time logic causes the delayed exception to be handled when execution of the executable reaches the source location, and causes other delayed exceptions associated with other relocated instructions to be abandoned when the delayed exception is handled.

2. The system of claim 1, the code section comprising one or more executable instructions.

3. The system of claim 1, the code section source address being an instruction address.

4. The system of claim 1, the code section source address being a block address.

5. The system of claim 1, where to identify whether the executed instruction is a relocated instruction includes comparing an address of an instruction to be executed to a code section destination address stored in the data store.

6. The system of claim 1, where to delay handling the exception includes storing in the data store delayed exception data associated with the exception.

7. The system of claim 1, where to abandon a delayed exception includes deleting from the data store delayed exception data associated with the delayed exception.

8. The system of claim 1, the relocation logic comprising an optimizing compiler.

9. The system of claim 1, the executable comprising instructions produced from PL/SQL (procedural language, structured query language) statements.

10. The system of claim 9, the executable being created in a PRE (partial redundancy elimination) environment.

11. The system of claim 1, the run-time logic comprising an operating system.

12. A computer-implemented method, comprising:
    executing, with at least a processor, a program;
    determining that an operation from the executing program has raised an exception and that the operation is a relocated operation, where the relocated operation is at a relocated location in the program and was previously at an original location in the program;
    causing handling of the exception to be delayed when the exception is raised by the relocated operation, the exception being delayed until the execution of the program reaches the original location of the operation in the program; and
    when the execution of the program reaches the original location of the operation in the program, handling the delayed exception and dismissing other delayed exceptions that are pending from other relocated operations in the program.

13. The method of claim 12, where causing the handling of the exception to be delayed comprises:

selectively storing data concerning the exception and the operation upon determining that an execution address in the program associated with the operation matches the relocated location of the operation in the program.

14. The method of claim 12, including prior to executing the program:

relocating a portion of the program, which is executable, from a first location in the executable program to a second location in the executable program, the first location being a relocated operation source and the second location being a relocated operation destination; and storing data concerning an association between the relocated operation source and the relocated operation destination.

15. The method of claim 12, including:

causing a break point to be associated with the original location of the relocated operation in the program; and where determining that the execution of the program reaches the original location of the operation in the program includes detecting that the break point is associated with the operation.

16. A system, comprising:

means for relocating a plurality of computer-executable instructions in a computer-executable program from an original location to a relocated destination in the computer-executable program;

means for storing information about each of the plurality of relocated computer-executable instructions including the original location and the corresponding relocated destination; and means for selectively delaying processing of an exception produced by one or more of the relocated computer-executable instructions during execution of the computer-executable program until the execution reaches the original location of the relocated computer-executable instruction that produced the exception, where once at the original location, the exception is handled and other delayed exceptions from other relocated computer-executable instructions are abandoned.

17. A non-transitory machine-readable medium having stored thereon machine-executable instructions that when executed by a machine cause the machine to perform a method, the method comprising:

executing a program;

determining that an operation from the executing program has raised an exception and that the operation is a relocated operation, where the relocated operation includes an original location in the program and was moved to a relocated location in the program prior to execution;

causing handling of the exception to be delayed when the exception is raised by a relocated operation, the exception being delayed until the execution of the program reaches the original location of the operation in the program; and when the execution of the program reaches the original location of the operation in the program, handling the delayed exception and dismissing other delayed exceptions that are pending from other relocated operations in the program.

* * * * *